US012637892B2

(12) United States Patent
Zhang et al.

(10) Patent No.: US 12,637,892 B2
(45) Date of Patent: May 26, 2026

(54) SIDE-HUNG DOOR DEVICE, TURNSTILE, AND CONTROL METHOD THEREFOR

(71) Applicant: H-SHINE CO., LTD, Spokane, WA (US)

(72) Inventors: Liang Zhang, Shanghai (CN); Jianfeng Xu, Shanghai (CN); Xianjie Zhu, Shanghai (CN); Silong Ma, Shanghai (CN)

(73) Assignee: H-SHINE CO., LTD, Spokane, WA (US)

( * ) Notice: Subject to any disclaimer, the term of this patent is extended or adjusted under 35 U.S.C. 154(b) by 0 days.

(21) Appl. No.: 18/764,181

(22) Filed: Jul. 4, 2024

(65) Prior Publication Data

US 2026/0009273 A1 Jan. 8, 2026

(51) Int. Cl.

| | |
|---|---|
| ***E05F 15/41*** | (2015.01) |
| ***E05F 5/06*** | (2006.01) |
| ***E05F 15/611*** | (2015.01) |
| ***E06B 11/08*** | (2006.01) |

(52) U.S. Cl.

CPC ................ *E05F 15/41* (2015.01); *E05F 5/06* (2013.01); *E05F 15/611* (2015.01); *E06B 11/08* (2013.01); *E06B 11/085* (2013.01); *E05Y 2900/40* (2013.01)

(58) Field of Classification Search

None

See application file for complete search history.

(56) References Cited

U.S. PATENT DOCUMENTS

| | | | | |
|---|---|---|---|---|
| 3,887,050 | A * | 6/1975 | Sheckells | E05F 15/608 74/411.5 |
| 8,136,297 | B2 * | 3/2012 | Bzorgi | E05F 15/40 49/43 |
| 2014/0020297 | A1 * | 1/2014 | Hammerle | E05F 15/70 49/31 |

FOREIGN PATENT DOCUMENTS

| | | | | |
|---|---|---|---|---|
| CN | 203411926 U | | 1/2014 | |
| CN | 111364913 A | * | 7/2020 | E06B 11/085 |

OTHER PUBLICATIONS

Machine translation of CN111364913A.*

* cited by examiner

*Primary Examiner* — Marcus Menezes

(74) *Attorney, Agent, or Firm* — Bayramoglu Law Offices LLC

(57) ABSTRACT

A side-hung door device, a turnstile, and a control method therefor comprise a door leaf, a rotating shaft assembly connected to the door leaf, a brake assembly connected to the rotating shaft assembly, and a drive assembly configured to drive the door leaf to rotate and arranged on the turnstile, and the like. The brake assembly comprises an upper end portion connected to the rotating shaft assembly, and a lower end portion connected to the drive assembly. The drive assembly is electrically connected to the brake assembly. When the door leaf rotates toward a closed position and is subjected to an external force greater than or equal to a first preset value, the drive assembly stops driving the rotating shaft assembly, simultaneously, the brake assembly is powered on, and the lower end portion meshes with the upper end portion to brake the rotating shaft assembly.

19 Claims, 15 Drawing Sheets

SIDE-HUNG DOOR DEVICE, TURNSTILE, AND CONTROL METHOD THEREFOR

TECHNICAL FIELD

The present disclosure relates to the field of turnstile equipment, and in particular, to a side-hung door device, a turnstile, and a control method therefor.

BACKGROUND

At present, opening and closing doors for existing turnstile channels are usually classified into three types, namely, a three-pole type, a door leaf type, and a side-hung type.

An existing side-hung type opening and closing door is opened or closed by performing arc rotation around a support shaft in a manner of rotating rather than by moving in a manner of translating, and moreover, the support shaft or a fulcrum needs to support weight of a door leaf, so a requirement on strength of the support shaft is high, and problems about torque and rotating speed of the supporting shaft or the fulcrum need to be solved by using a high-power motor for driving or configuring a low-power motor with a gearbox, as disclosed in Chinese patent document 201320428775.X.

Moreover, a side-hung door device for opening or closing the existing turnstile channel has a small thrust, a door mechanism is easily damaged when forced to open, and the existing turnstile channel is easily forced to open. A side-hung door control mechanism often cannot automatically open a door or can only open a door with a manual operation during a power failure, which easily leads to congestion of passenger flow to cause a potential safety hazard during the power failure in places with high passenger flow such as rail transit. Meanwhile, components of an existing side-hung door device are often complex.

Therefore, how to provide a side-hung door device, a turnstile, and a control method therefor is a technical problem to be solved in the present disclosure, so that a door leaf can be well prevented from being pushed to move to prevent forced opening when magnitude of a received thrust is within a preset range and can be opened again when the received thrust is significant.

SUMMARY

For disadvantages or deficiencies in a related art, a technical problem to be solved in the present disclosure is to provide a side-hung door device, a turnstile, and a control method therefor, so that a door leaf can be well prevented from being pushed to move to prevent forced opening when magnitude of a received thrust is within a preset range and can be opened again when the received thrust is significant.

To solve the above technical problem, the present disclosure provides a side-hung door device, including:

- a door leaf;
- a rotating shaft assembly connected to the door leaf;
- a brake assembly connected to the rotating shaft assembly; and
- a drive assembly arranged on a turnstile, connected to the brake assembly, and configured to drive the door leaf to rotate.

The brake assembly includes: an upper end portion fixedly arranged, and a lower end portion connected to the drive assembly and the rotating shaft assembly and rotatably arranged.

In a process that the door leaf rotates from an open position toward a closed position and after the door leaf is subjected to an external force greater than or equal to a first preset value, the brake assembly is powered on, and the lower end portion meshes with the upper end portion to brake the rotating shaft assembly.

After the door leaf is subjected to an external force greater than a second preset value, the lower end portion and the upper end portion generate meshing displacement to enable the door leaf to displace. The second preset value is greater than the first preset value.

Further, as a preference, the side-hung door device further includes: a supporting frame configured to fix the upper end portion. The supporting frame includes: a cover plate component connected to the upper end portion and provided with a through hole, and multiple supporting components respectively connected to the cover plate component and the rotating shaft assembly with two opposite ends and forming a placement space for placing the brake assembly. The through hole is configured for an output shaft of the drive assembly to penetrate to connect the output shaft to the rotating shaft assembly.

And/or, the through hole is configured for a protrusion component that is formed by a top of the upper end portion protruding upward to fit and insert to fix and constrain the upper end portion. A shape of the through hole is a rectangle or a polygon.

Further, as a preference, the side-hung door device further includes: a rotation angle limiting assembly configured to limit a rotation angle of the lower end portion. The rotation angle limiting assembly includes: a rotation angle limiting base fixedly arranged, a rotation limiting block connected to the lower end portion and capable of generating axial sliding, and a limiting block arranged on the rotation angle limiting base and configured to limit a rotation angle of the rotation limiting block.

Further, as a preference, the rotation limiting block includes: a rotating body and a protrusion portion connected to the rotating body. A groove configured to limit the protrusion portion is provided on the limiting block.

Further, as a preference, multiple bosses are formed along a circumferential direction of the rotating body; a limiting groove body configured for the bosses to insert is provided on the lower end portion;

and/or, the limiting block at least includes: a first limiting block and a second limiting block symmetrically arranged.

Further, as a preference, the brake assembly is a jaw brake;

- and/or, both the upper end portion and the lower end portion are disc components provided with meshing teeth in end portions, and the meshing teeth are distributed along circumferential directions of the disc components;
- and/or, an arrangement direction of the drive assembly is perpendicular to an arrangement direction of the rotating shaft assembly, and the drive assembly is connected to the rotating shaft assembly through a rotating shaft;
- and/or, at least one of the upper end portion and the lower end portion is provided with an electromagnet that is electrically connected to the outside and enables the upper end portion and the lower end portion adsorb and engage with each other when powered on.

Further, as a preference, the lower end portion includes a first body provided with meshing teeth at a top end, and a rotating disc slidably connected to the first body and capable of sliding along an axial direction of the first body. The limiting groove body is formed in the rotating disc to generate axial movement with the rotating body. The first body moves upward when the brake assembly is powered on, and is adsorbed and meshed by the upper end portion to enable the rotating shaft assembly to be braked following the lower end portion.

Further, as a preference, the rotating shaft assembly includes: a rotating shaft connected to the door leaf, a bearing connected to the rotating shaft, and a coupling with one end connected to the bearing and the other end configured to connect the output shaft. The coupling is connected to the upper end portion.

Further, as a preference, the drive assembly includes: a speed reducer connected to the rotating shaft assembly, a drive motor, and an electromagnetic brake that has one end connected to an input shaft of the speed reducer and the other end connected to the drive motor and that is configured to brake the rotating shaft assembly.

Further, as a preference, the drive assembly further includes: a steering speed reducer with one end connected to the rotating shaft assembly and the other end connected to the speed reducer; and the drive motor includes: a servo motor configured to drive a drive shaft to rotate, and a servo controller electrically connected to the servo motor. An axial direction of the drive shaft is perpendicular to a direction of the rotating shaft of the door leaf.

And/or, the electromagnetic brake is configured to be synchronously powered on with the brake assembly to brake the door leaf, and to lose power after a preset time after the brake assembly loses power to release brake of the door leaf one after another. The preset time is 200 to 400 milliseconds.

Further, as a preference, the side-hung door device further includes: a multi-turn encoder arranged on the drive shaft of the drive motor.

Further, as a preference, the side-hung door device further includes: an automatic reset mechanism connected to the drive assembly, and configured to reset the door leaf to an initial open position when the turnstile is powered off.

Further, as a preference, the automatic reset mechanism at least includes: a reset electromagnetic brake, a torsion spring locking passive member, a torsion spring locking active member, a first reset torsion spring fixing block, a self-resetting torsion spring, a second reset torsion spring fixing block sequentially sleeved over a brake shaft of the drive assembly, and a torsion spring locking fixing member configured to fix the second reset torsion spring fixing block.

One end of the reset electromagnetic brake is fixedly connected to the drive assembly, and the other end is connected to the torsion spring locking passive member. When the brake assembly and the electromagnetic brake of the drive assembly lose power, a dynamic brake pad in the reset electromagnetic brake is disengaged from a static brake pad, so that the torsion spring locking passive member is unconstrained and follows the torsion spring locking active member to rotate under a resetting action of the self-resetting torsion spring, and the door leaf is reset to the initial open position.

Further, as a preference, the automatic reset mechanism at least includes: multiple bearing components arranged inside the self-resetting torsion spring, sleeved over the brake shaft, and coaxially arranged.

Further, as a preference, at least part two adjacent bearing components press against each other;

- and/or, a bearing component located at a head end is pressed against the first reset torsion spring fixing block, and a bearing component located at a tail end is pressed against the second reset torsion spring fixing block;
- and/or, a bearing bush that is sleeved over the brake shaft is spaced between at least part two adjacent bearing components;
- and/or, a distance between two adjacent bearing components is gradually reduced from a central area of the self-resetting torsion spring toward two opposite ends of the self-resetting torsion spring until the two adjacent bearing components press against each other; and/or, a bearing component located at a head end is pressed against the first reset torsion spring fixing block, and a bearing component located at a tail end is pressed against the second reset torsion spring fixing block;
- and/or, a bearing bush that is sleeved over the brake shaft is spaced between at least part two adjacent bearing components;
- and/or, a distance between two adjacent bearing components is gradually reduced from a central area of the self-resetting torsion spring toward two opposite ends of the self-resetting torsion spring until the two adjacent bearing components press against each other.

Further, as a preference, the first preset value is 75+/−7.5 N, and the second preset value is 700.

The present application further provides a turnstile, including the side-hung door device mentioned above.

The present application further provides a control method for a side-hung door device, including:

- obtaining a first feedback signal when a door leaf is subjected to an external force greater than or equal to a first preset value and less than a second preset value; and
- controlling a drive assembly to stop driving the door leaf according to the obtained first feedback signal, and powering on a brake assembly to enable a lower end portion of the brake assembly to move upward and mesh with an upper end portion to brake a rotating shaft assembly configured to control the door leaf to rotate.

Further, as a preference, before or after a step of obtaining the first feedback signal after the external force received by the door leaf is greater than or equal to the first preset value and is less than the second preset value, the method further includes:

- controlling the drive assembly to stop driving the door leaf according to the obtained first feedback signal, and powering on the brake assembly to form the meshing and simultaneously powering on an electromagnetic brake to synchronously brake the rotating shaft assembly configured to control the door leaf to rotate;
- receiving an opening signal transmitted by a turnstile after it is detected that no person passes through a turnstile channel; and
- before or after a step of obtaining the first feedback signal after enabling the brake assembly to lose power according to the opening signal, after enabling the electromagnetic brake to lose power after a preset time to release brake of the door leaf one after another, and after the door leaf is subjected to the external force greater than or equal to the first preset value and less than the second preset value, the method further includes:
- controlling the drive assembly to stop driving the door leaf according to the obtained first feedback signal, and powering on the brake assembly to form the meshing and simultaneously powering on an electromagnetic brake to synchronously brake the rotating shaft assembly configured to control the door leaf to rotate;

receiving an opening signal transmitted by a turnstile after it is detected that no person passes through a turnstile channel; and enabling the brake assembly to lose power according to the opening signal and enabling the electromagnetic brake to lose power after a preset time to release brake of the door leaf one after another.

Further, as a preference, before or after a step of controlling the drive assembly to stop driving the door leaf according to the obtained first feedback signal, and powering on a brake assembly to enable a lower end portion of the brake assembly to move upward and mesh with an upper end portion to brake the rotating shaft assembly configured to control the door leaf to rotate, the method further includes:

obtaining a second feedback signal when the door leaf is subjected to the external force greater than or equal to the second preset value, where the second preset value is greater than the first preset value; and stopping driving the rotating shaft assembly by the drive assembly according to the obtained second feedback signal.

Further, as a preference, the first preset value is 75+/−7.5 N, and the second preset value is 700.

Further, as a preference, the preset time is 200 to 400 milliseconds.

Compared with a related art, according to the side-hung door device, the turnstile, and the control method therefor provided in the present application, a door leaf cannot be pushed to move to prevent forced opening when magnitude of a received thrust is within a preset range and can be opened again when the received thrust is significant.

BRIEF DESCRIPTION OF THE DRAWINGS

Other features, objects, and advantages of the present application will become more apparent by reading the detailed description of the non-limiting embodiments with reference to the following drawings.

REFERENCE SIGNS IN THE DRAWINGS

Figure 1:
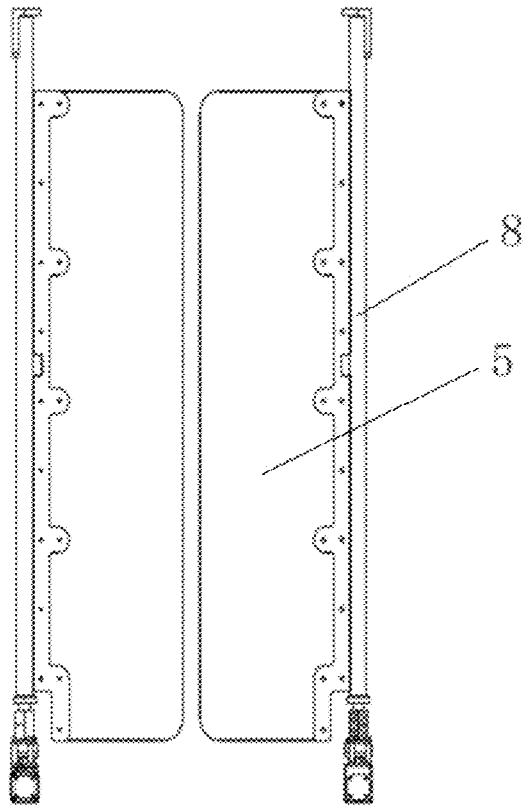
FIG. 1 is a schematic diagram of a door leaf located at a closed position in a first embodiment of the present disclosure.
Figure 2:
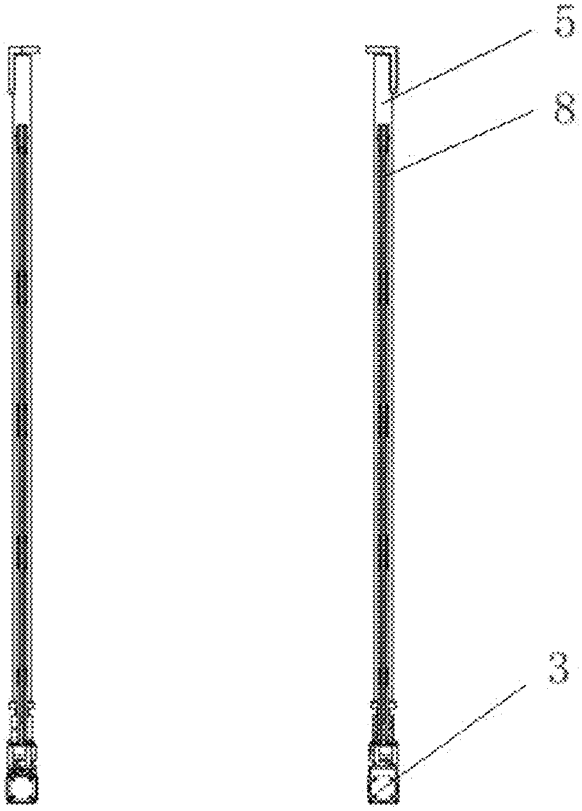
FIG. 2 is a schematic diagram of a door leaf located at an open position in the first embodiment of the present disclosure.
Figure 3:
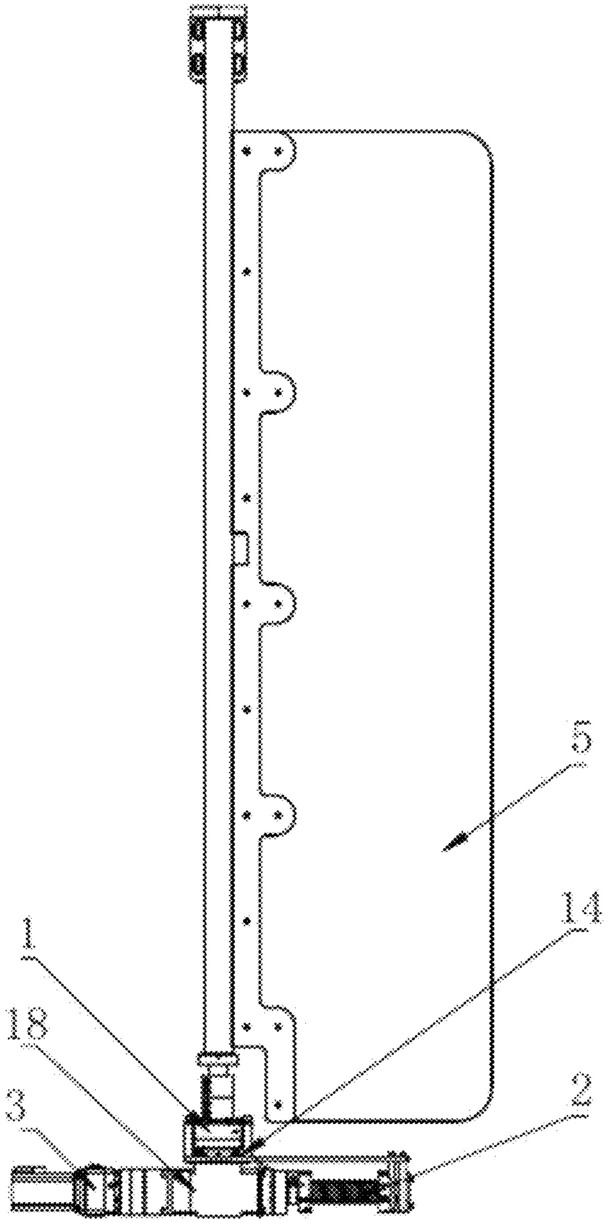
FIG. 3 is a schematic diagram of a specific structure of a side-hung door device in the first embodiment of the present disclosure.

1—brake assembly, 2—automatic reset mechanism, 3—drive assembly, 5—door leaf, 6—bearing, 10—cover plate component, 100—through hole, 101—supporting component, 11—upper end portion, 111—protrusion component, 12—lower end portion, 121—meshing tooth, 120—limiting groove body, 122—supporting component, 13—rotation limiting block, 14—rotation angle limiting base, 15—limiting block, 16—limiting block, 151—groove, 17—rotation limiting block, 18—steering speed reducer, 181—output shaft, 182—brake shaft, 19—reset electromagnetic brake, 20—torsion spring locking passive member, 21—torsion spring locking active member, 22—first reset torsion spring fixing block, 23—self-resetting torsion spring, 24—second reset torsion spring fixing block, 25—torsion spring locking fixing member, 26—speed reducer output shaft, 27—speed reducer, 28—brake shaft, 29—bearing component, 30—electromagnetic brake, 30*a*—upper part mounting member of electromagnetic brake, 30*b*—lower part mounting member of electromagnetic brake, 31—servo motor, and 291—bearing bush.

DETAILED DESCRIPTION OF THE EMBODIMENTS

A conception, specific structures, and achieved technical effects of the present disclosure will be further described below with reference to drawings, so as to fully to be understood purposes, features, and effects of the present disclosure.

As shown in FIG. 1 to FIG. 16, an embodiment of the present disclosure provides a side-hung door device, which is configured to be arranged on a turnstile. The side-hung door device mainly includes a door leaf 5, a rotating shaft assembly connected to the door leaf 5, a brake assembly 1 connected to the rotating shaft assembly, and a drive assembly 3 configured to drive the door leaf 5 to rotate and arranged on the turnstile, and the like.

The brake assembly 1 mainly includes an upper end portion 11 fixedly arranged, a lower end portion 12 connected to the drive assembly and the rotating shaft assembly and rotatably arranged, and the like. Moreover, the drive assembly is electrically connected to the brake assembly 1.

In a process that the door leaf 5 rotates from an open position toward a closed position and after the door leaf 5 is subjected to an external force greater than or equal to a first preset value, the drive assembly stops driving the rotating shaft assembly, simultaneously, the brake assembly 1 is powered on, and the lower end portion 12 follows the door leaf to rotate to any angle, or may move upward and mesh with the upper end portion 11 when the brake assembly 1 is powered on, so that the door leaf 5 stops actively rotating.

After the door leaf 5 is subjected to the external force greater than a second preset value, the lower end portion 12 and the upper end portion 11 generate meshing displacement to enable the door leaf to displace. The second preset value is greater than the first preset value.

From above content, it can be learned that: the side-hung door device provided in the present disclosure uses the brake assembly 1 consisting of the upper end portion 11 and the lower end portion 12 that mesh with each other when powered on, so that the drive assembly stops actively driving the rotating shaft assembly to rotate in a case that a pedestrian breaks in, that is, the door leaf is pushed by an external force, for example, greater than or equal to a corresponding preset value, for example, preset resistance set within a range of 75+/−10% N in a process that the door leaf rotates from the open position to the closed position, and the brake assembly 1 is powered on, so that the upper end portion 11 and the lower end portion 12 mesh with each other to brake the rotating shaft assembly to achieve emergency brake of the door leaf 5, thereby preventing a human body from breaking in successfully in some situations. Meanwhile, to prevent the human body from being easily injured by collision of a door leaf when the human body breaks in, that is, encountering a case that the turnstile is closed by the door leaf. Therefore, when the human body breaks in and the door leaf receive a thrust greater than a corresponding preset value, for example, 700 N, the upper end portion 11 and the lower end portion 12 of the brake assembly 1 are disengaged from each other, so that the door leaf generates displacement by forcibly pushing, thereby reducing the injury to the human body. Therefore, maximum resistance set for preventing the human body from breaking in is improved, and the injury to the human body when breaking in is reduced in a meshing braking manner of the brake assembly 1. When the thrust forcibly pushing the door leaf disappears, the door leaf of the side-hung door device will be restored to a closed state, so as to close the turnstile channel to ensure normal operation of the turnstile.

Specifically, the side-hung door device further includes: a rotation angle limiting assembly configured to limit a rotation angle of the lower end portion 12. The rotation angle limiting assembly includes: a rotation angle limiting base 14 connected to the drive assembly, a rotation limiting block 13 connected to the lower end portion 12, and a limiting block arranged on the rotation angle limiting base 14 and configured to limit a rotation angle of the rotation limiting block 13. Through this structure, the door leaf may be well prevented from being damaged by colliding with a housing of the turnstile during opening and closing.

Further, as a preference, the side-hung door device further includes: a supporting frame arranged on the rotation angle limiting base 14 and configured to fix the upper end portion 11. The supporting frame includes: a cover plate component 10 connected to the upper end portion 11 and provided with a through hole 100, and multiple supporting components 101 with one end connected to the cover plate component 10 and the other end connected to the rotation angle limiting base 14 in the rotating shaft assembly to form a placement space between the cover plate component 10 and the rotation angle limiting base 14. The through hole 100 is configured for an output shaft of the drive assembly to penetrate. The supporting component 101 may be preferably a bolt, a stud, or the like. Through this structure, connection firmness between the rotation angle limiting base 14 and the upper end portion 11 of the brake assembly 1 can be enhanced, so as to improve an impact force received by the door leaf and avoid displacement or shaking of the upper end portion 11 due to significant vibration generated by the impact force, thereby improving impact resistance of the door leaf when impacted.

Figure 5:
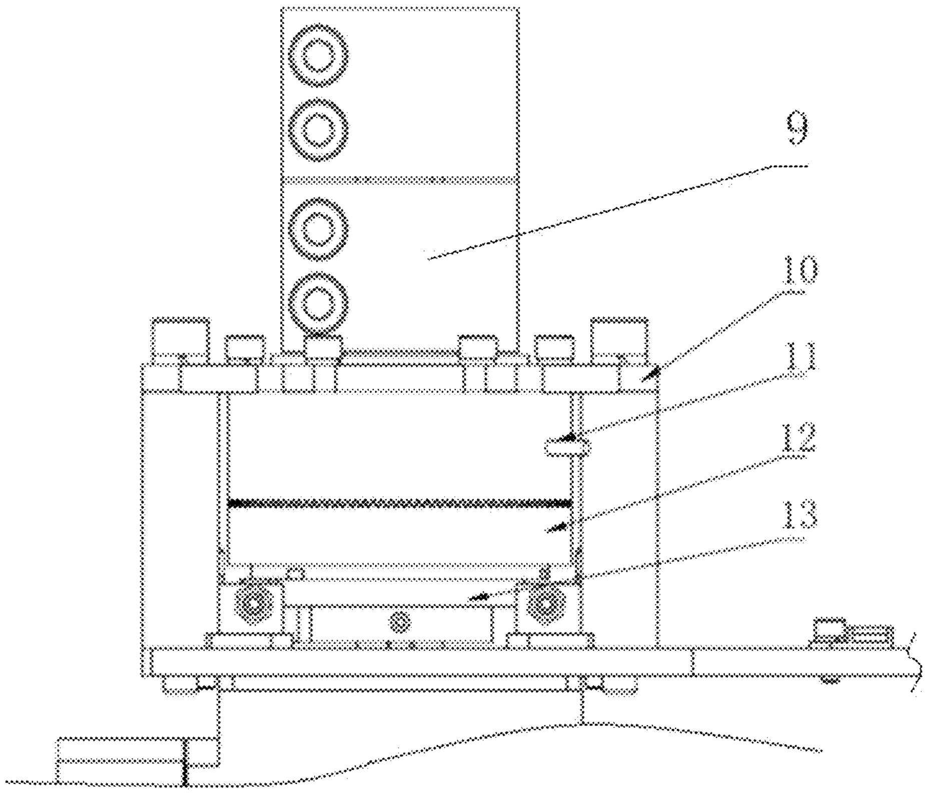
FIG. 5 is a schematic structural diagram of a brake assembly in the first embodiment of the present disclosure.
Figure 10:
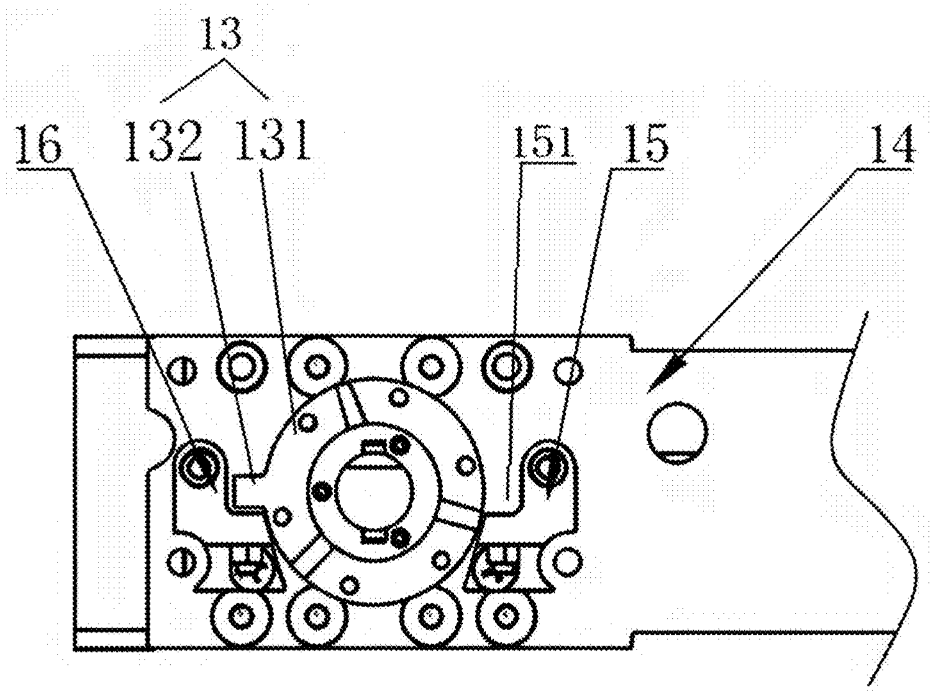
FIG. 10 is a schematic structural diagram of a rotation angle limiting assembly in the first embodiment of the present disclosure.
Figure 11:
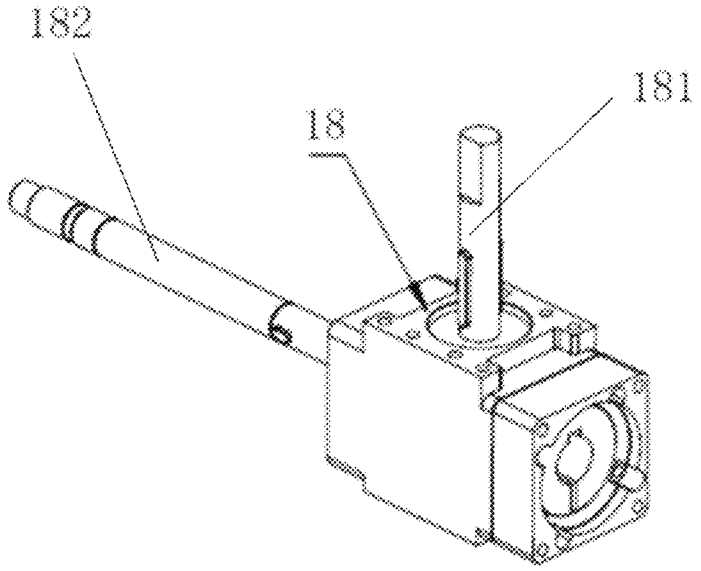
FIG. 11 is a schematic diagram of a steering speed reducer in the first embodiment of the present disclosure.

Further, as a preference, as shown in FIG. 5 and FIG. 10, the rotation limiting block 13 includes: a rotating body 131 and a protrusion portion 132 connected to the rotating body 131. Moreover, a shaft hole configured for the output shaft to penetrate is provided on the rotating body 131. The limiting block at least includes: a first limiting block 16 and a second limiting block 15 symmetrically arranged. Grooves 151 for limiting the protrusion portion 132 are provided on the first limiting block 16 and the second limiting block 15. An rotation angle of the rotation limiting block 13 may be limited within a range of 180° through the first limiting block 16 and the second limiting block 15, so as to meeting a requirement on passage, especially, bidirectional passage, and avoid collision with the turnstile.

Further, as a preference, multiple bosses 1311 are formed along a circumferential direction of the rotating body 131. The lower end portion 12 is provided with a limiting groove body 120 configured for the bosses 1311 to insert. Through this structure, connection firmness between the rotating body 131 and the lower end portion 12 of the brake assembly 1 can be enhanced, so as to improve an impact force received by the door leaf and avoid disengagement of the lower end portion 12 from the rotation limiting block 13 due to significant vibration generated by the impact force.

Figure 6:
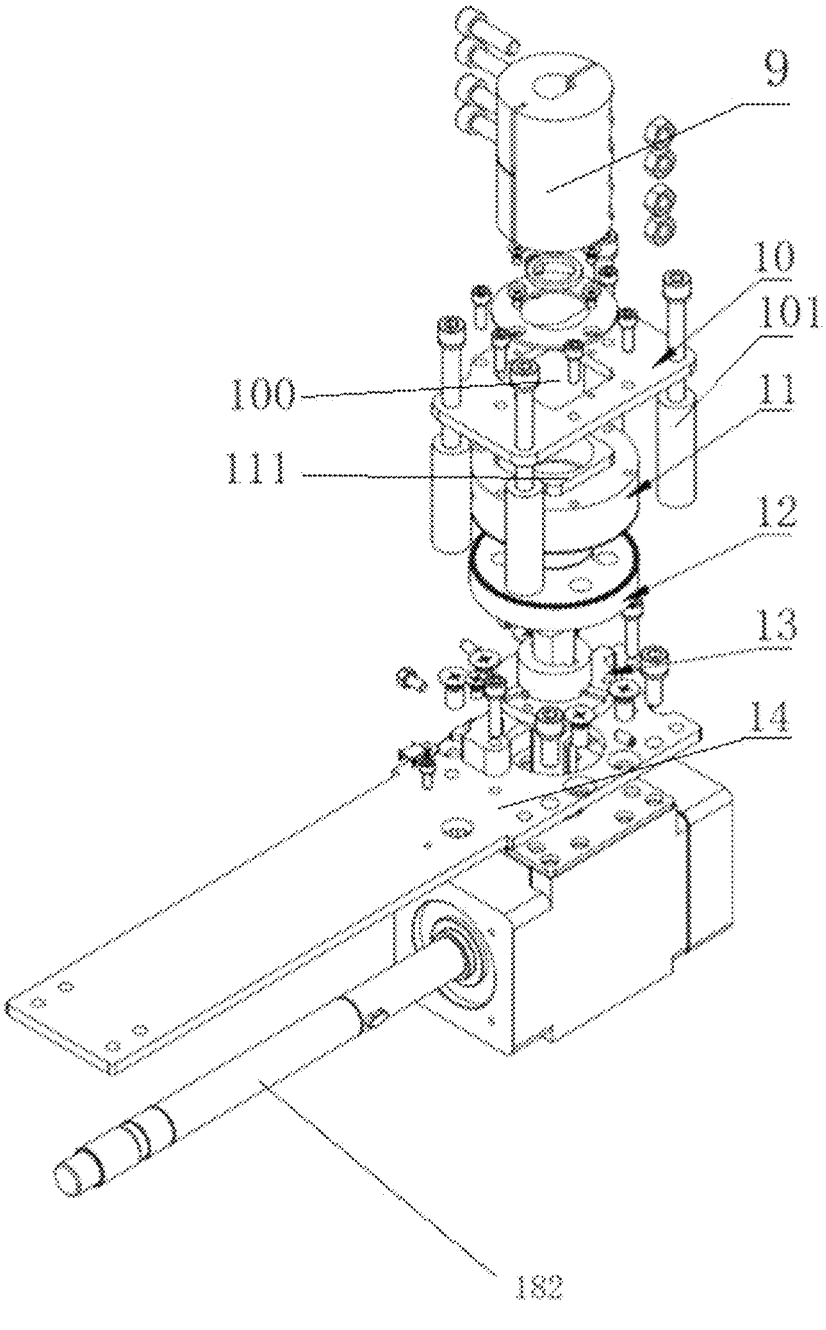
FIG. 6 is an exploded view of a structure of the brake assembly in the first embodiment of the present disclosure.
Figure 7:
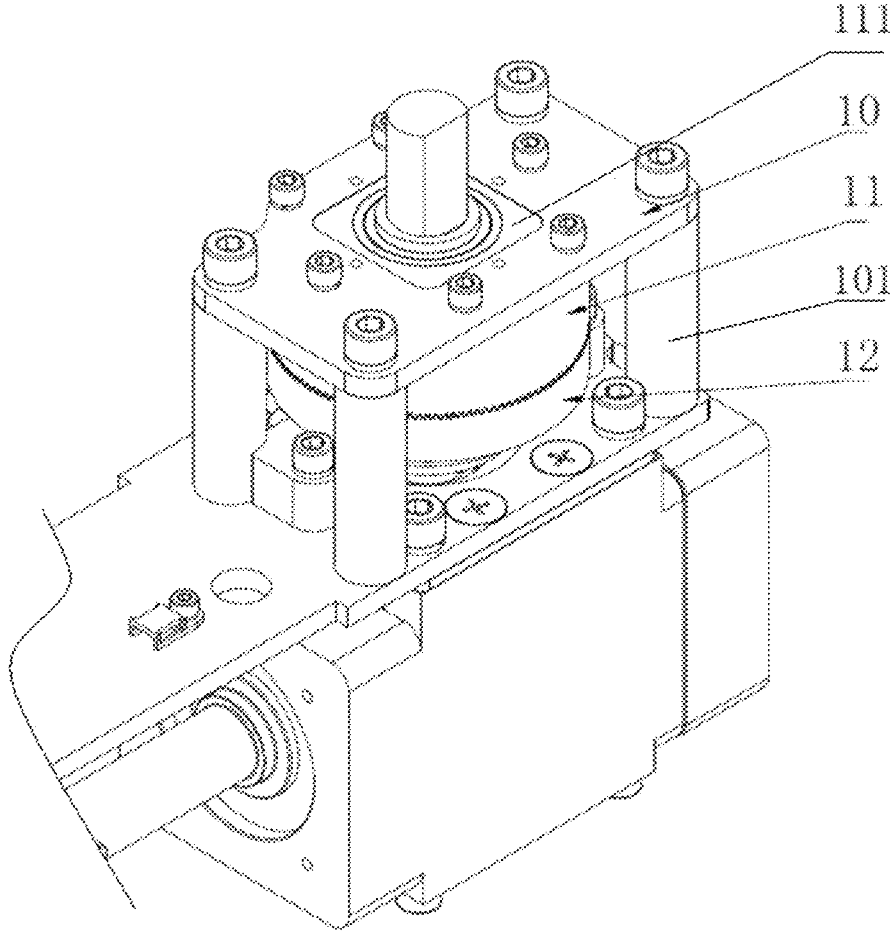
FIG. 7 is a schematic diagram of a partial state of the brake assembly during braking in the first embodiment of the present disclosure.
Figure 8:
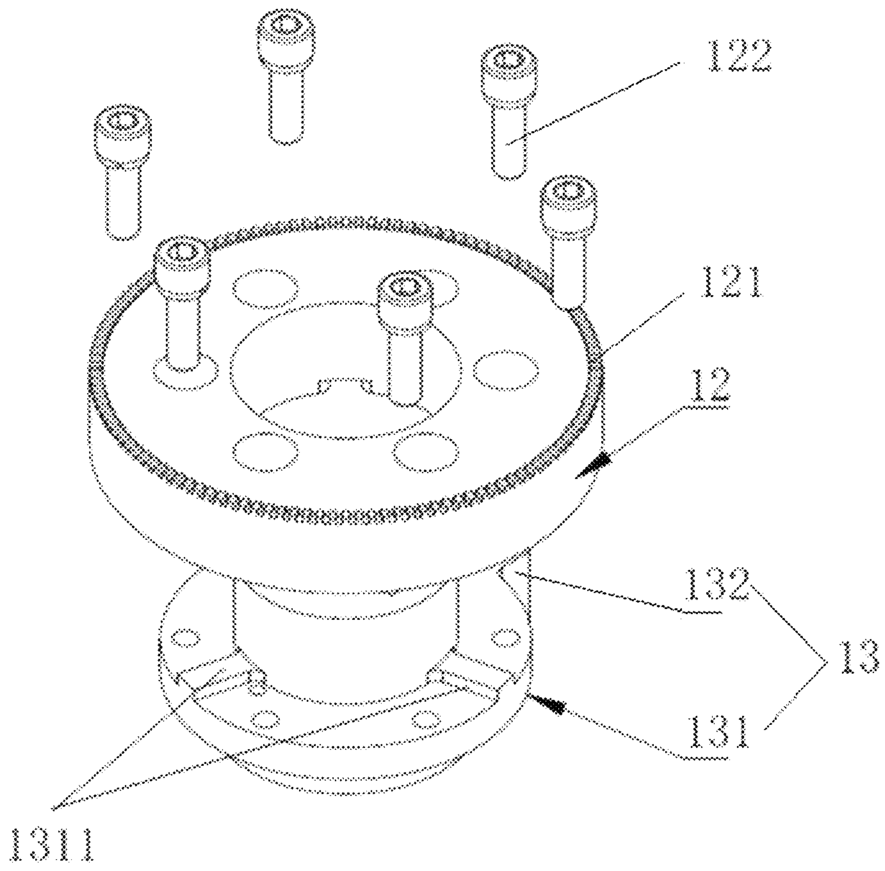
FIG. 8 is a schematic diagram of an exploded structure of a lower end portion of the brake assembly in the first embodiment of the present disclosure.

In detail, as shown in FIG. 6 and FIG. 7, in this embodiment, the upper end portion 11 of the brake assembly 1 is fixed to a lower end of the cover plate component 10. After a protrusion component 111 convexly arranged on an upper surface of the upper end portion 11 and a rectangular gap in the cover plate component 10 (namely, the through hole 100) are combined with each other for poisoning and are fixed by fasteners such as multiple bolts, the impact force received by the door leaf can be improved. Meanwhile, the lower end portion 12 of the brake assembly 1 is fixed to an upper end of the rotation limiting block 13, and is fixed by fasteners such as multiple bolts.

Three limiting groove bodies 120 are provided in the lower end portion 12 and are combined for positioning with the bosses 1311 corresponding to the upper end of the rotation limiting block 13, so as to further improve the impact force on the door leaf. The limiting groove bodies 120 are uniformly provided along a circumferential direction of the lower end portion 12.

Further, as a preference, the brake assembly 1 is a jaw brake. Both the upper end portion 11 and the lower end portion 12 are disc components provided with meshing teeth in end portions, and the meshing teeth are distributed along circumferential directions of the disc components. In addition, the jaw brake may alternatively use a device that can realize above functions in a related art, for example, a jaw brake with a model number of DZY5-10 (F), and is further improved on this basis. No specific limitations and descriptions are made here.

Further, as a preference, an arrangement direction of the drive assembly is perpendicular to an arrangement direction of the rotating shaft assembly, and the drive assembly is connected to the rotating shaft assembly through a rotating shaft.

Further, as a preference, at least one of the upper end portion 11 and the lower end portion 12 is provided with an electromagnet that is electrically connected to the outside and enables the upper end portion 11 and the lower end portion 12 adsorb and engage with each other when powered on. Moreover, the electromagnet in this embodiment is preferably arranged on the upper end portion 11, so as to facilitate actual circuit layout.

Figure 9:
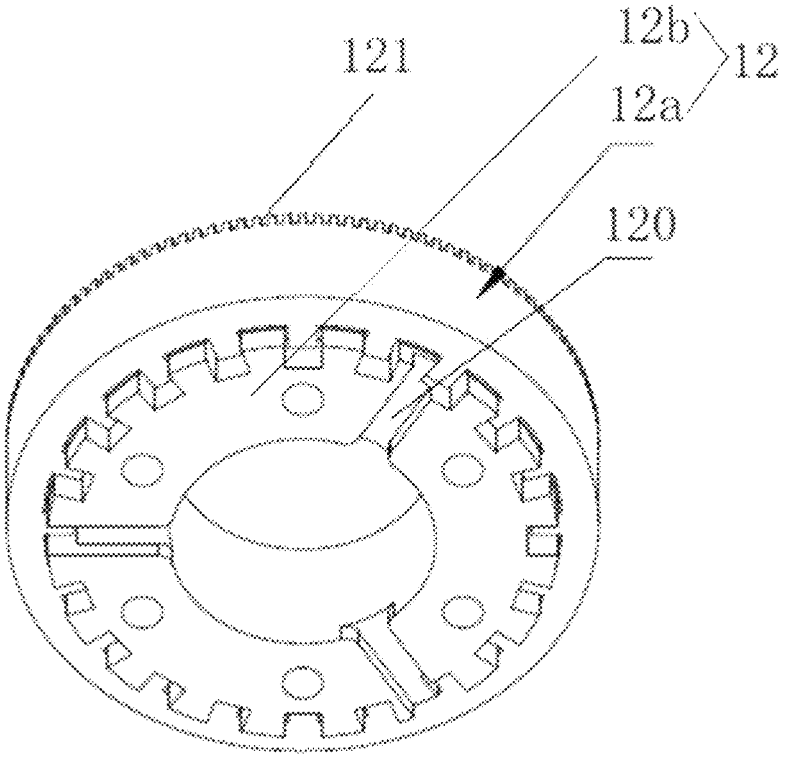
FIG. 9 is a schematic structural diagram of the lower end portion of the brake assembly in the first embodiment of the present disclosure.

Further, as a preference, as shown in FIG. 9, the lower end portion 12 includes: a first body 12*a* provided with meshing teeth at a top end, and a rotating disc 12*b* that meshes and rotates with a bottom of the first body 12*a*. Multiple of the limiting groove bodies 120 are provided in the rotating disc 12*a* and are configured for the bosses 1311 to fit and insert, so as to generate axial movement with the rotating body 131. The first body 12*a* is configured to move upward when the upper end portion 11 is powered on, generate relative sliding with the rotating disc 12*b* in an axial direction, and engage with the upper end portion 11 after sliding for a preset distance, and is kept in connection with the rotating disc 12*a*, so that the rotating shaft assembly is braked, and the door leaf stop rotating.

Further, as a preference, numbers of meshing teeth at the top and the bottom of the lower end portion 12 are different, and the number of the meshing teeth at the top of the lower end portion 12 is greater than the number of the meshing teeth at the bottom of the lower end portion 12.

Figure 4:
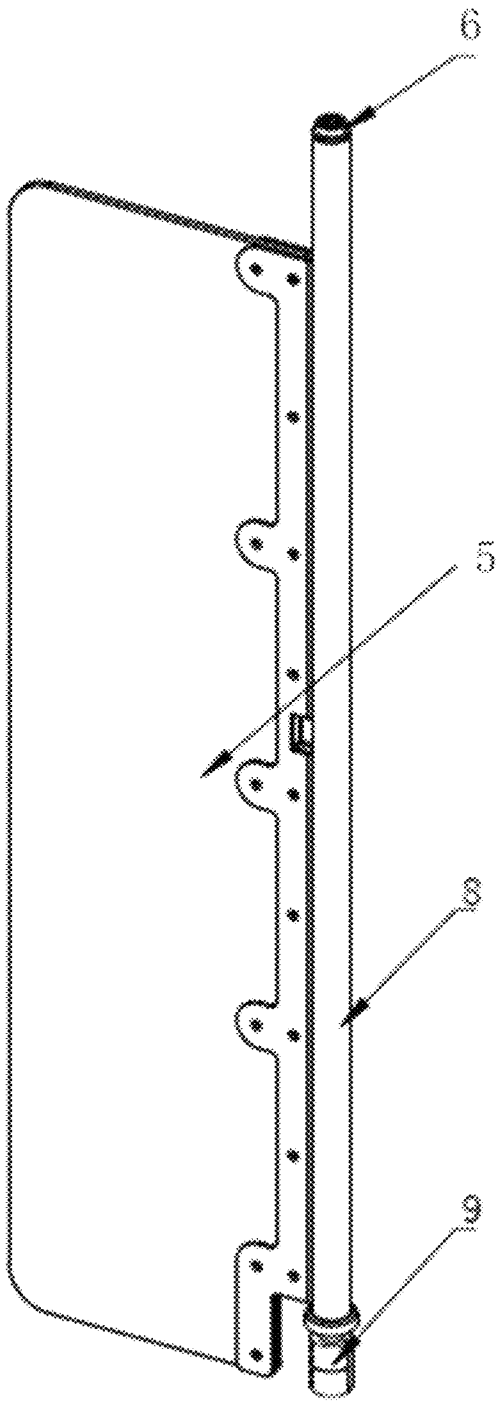
FIG. 4 is a schematic diagram of a door leaf and a rotating shaft assembly in the first embodiment of the present disclosure.

Further, as a preference, to meet actual design requirements, as shown in FIG. 4 and FIG. 5, the rotating shaft assembly includes: a rotating shaft 8 connected to the door leaf 5, a bearing 6 connected to the rotating shaft 8, and a coupling 9 with one end connected to the bearing 6 and the other end configured to connect the output shaft. The coupling 9 is connected to the upper end portion 11. Bearings 6 are arranged at two opposite ends of the rotating shaft 8, so that the rotating shaft 8 is rotatably arranged on a corresponding supporting frame of the turnstile or the turnstile.

Figure 14:
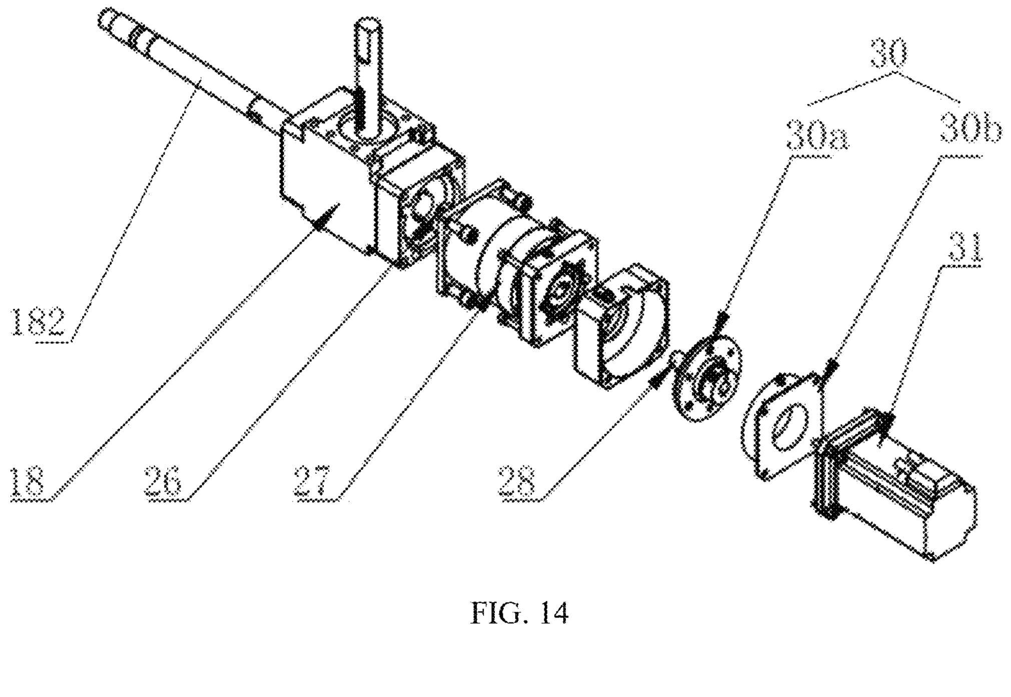
FIG. 14 is a schematic diagram of an exploded structure of a drive assembly in the first embodiment of the present disclosure.
Figure 15:
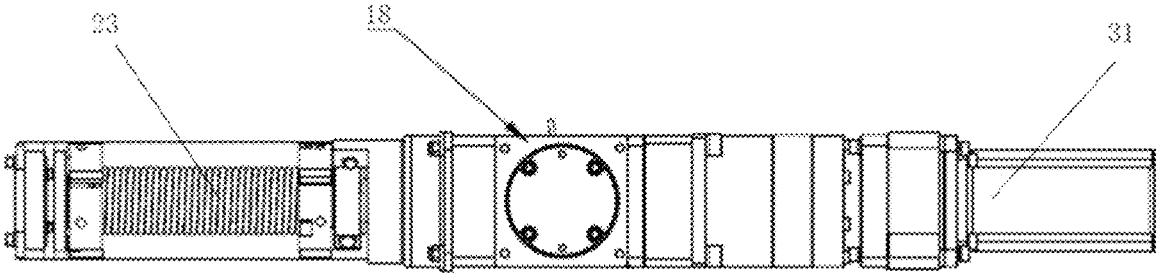
FIG. 15 is a vertical view of the side-hung door device in the first embodiment of the present disclosure.
Figure 16:
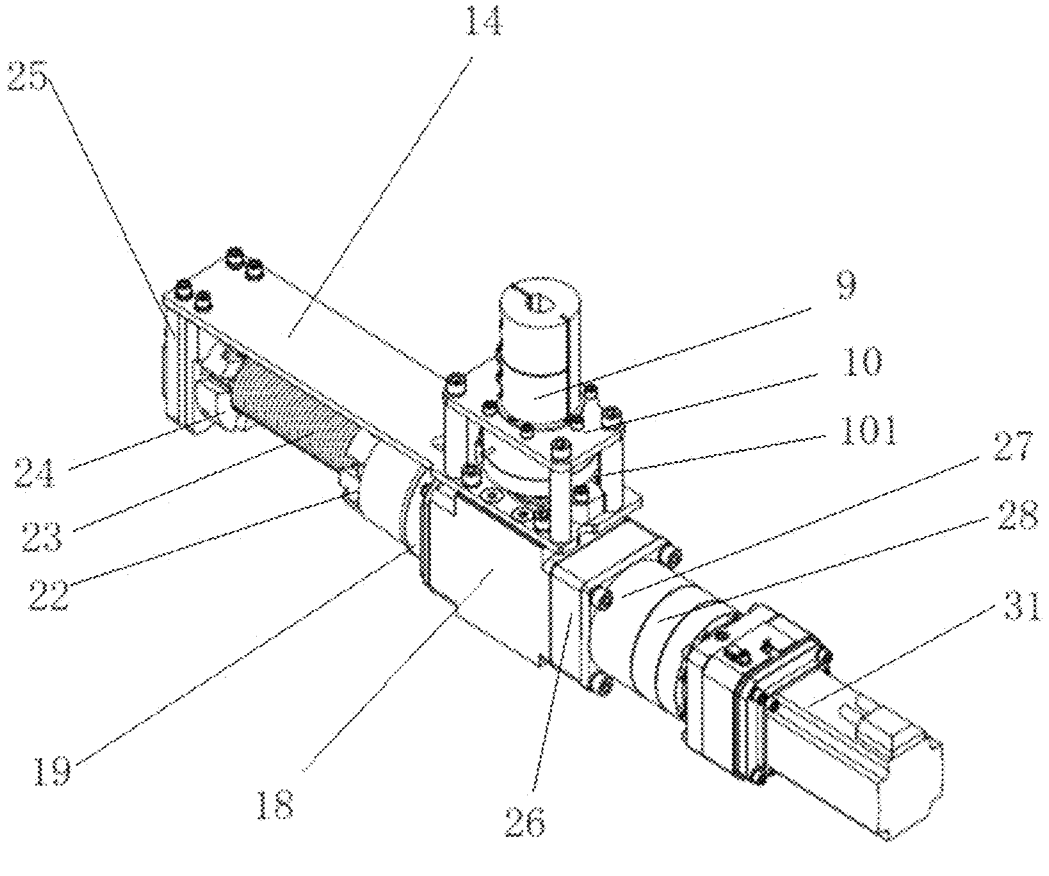
FIG. 16 is a schematic diagram of a three-dimensional structure of a horizontal side-hung door device in the first embodiment of the present disclosure.

Further, as a preference, as shown in FIG. 14, the drive assembly includes: a speed reducer 27 connected to the output shaft, a drive motor, and an electromagnetic brake 30 that has one end connected to an input shaft of the speed reducer 27 and the other end connected to the drive motor. When the door leaf is in a closing movement process, the door leaf is sometimes subjected to resistance greater than 67.5 N or 82.5 N, or resistance corresponding to a resistance value between 67.5 N and 82.5 N. This resistance is transferred to drive shaft of the drive motor through a speed reducer 27, a corresponding control device will receive a resistance feedback signal applied to the drive motor, and the control device transmits a closing command to the drive motor according to the received feedback signal, for example, the resistance feedback signal, so that the drive shaft of the drive motor stops rotating, and the brake assembly 1 and the electromagnetic brake 30 are controlled to be powered on. Thus, the door leaf immediately stops rotating. Since the door leaf rapidly stops moving, a pedestrian passing through the turnstile is prevented from being caught by the door leaf, and a function of preventing the pedestrian from being caught by the door leaf is realized. After the resistance disappears, the side-hung door device will be restored to a state in a closed position.

Further, as a preference, the drive motor may be formed by a servo motor 31 configured to drive the drive shaft to rotate, and a servo controller electrically connected to the servo motor 31. An axial direction of the drive shaft is perpendicular to a direction of the rotating shaft of the door leaf 5.

Further, as a preference, as shown in FIG. 14, the drive assembly further includes: a steering speed reducer 18 arranged on the rotation angle limiting base 14 and connected to the coupling 9 of the rotating shaft assembly through an output shaft 181, the speed reducer 27 connected to an input shaft of the steering speed reducer 18, an electromagnetic brake 30 that has one end connected to an input shaft of the speed reducer 27 and the other end connected to the servo motor 31 and that is configured to brake the rotating shaft assembly, the servo motor 31 configured to drive the drive shaft to rotate, the servo controller electrically connected to the servo motor 31, and the like. The output shaft 181 is preferably an output shaft of the steering speed reducer 18. An axial direction of the drive shaft of the drive motor is perpendicular to a direction of the rotating shaft of the door leaf 5. When the pedestrian forcibly passes through the turnstile, the door leaf will be subjected to a powerful opening thrust. This thrust is transferred to the output shaft 181 of the speed reducer 27 through the output shaft 181 of the steering speed reducer 18, and then is transferred to the drive shaft of the servo motor.

Through this structure, the side-hung door device may be a horizontal side-hung door mechanism, which not only facilitates layout in space, for example, increasing spatial layout and increasing an overall dimension of the drive assembly, but also changes a transverse transmission force of the servo motor into a vertical rotating force after turning 90° through the cooperation of the steering speed reducer, thereby well reducing a transferring speed and increasing transferring torque. The side-hung door device has the characteristics of low noise, low energy consumption, adjustable speed, adjustable torsional force, and significant thrust, and the like.

In addition, an affect of double insurance can be achieved through cooperation of the electromagnetic brake 30 and the brake assembly 1. Specifically, the electromagnetic brake 30 and the brake assembly 1 are simultaneously powered on for braking, rapid braking can be achieved, that is, delayed braking caused by slow response of one brake is avoided during rapid brake of the door leaf, and meanwhile, a braking force is improved. After braking of the electromagnetic brake 30 and the brake assembly 1 needs to be released, there is a time difference between the engagement and disengagement of the electromagnetic brake 30 and the brake assembly 1. The electromagnetic brake 30 has a quick braking response, and the brake assembly 1 has a slow braking response. When braking is unlocked, that is, the brake of the door leaf is released, the brakes have different response speeds, and need to be unlocked one after another. Therefore, the brake assembly 1 with a slow response is enabled to lose power first to unlock brake assembly 1 in advance. Then, after a preset time of 200 milliseconds, the electromagnetic brake 30 with a quick response is enabled to lose power to unlock the electromagnetic brake 30. Thus, the electromagnetic brake 30 may be unlocked simultaneously in user experience, and the door leaf is prevented from tentatively getting out of control since the upper end portion 11 is directly disengaged from the lower end portion 12 after the electromagnetic brake 30 is unlocked in advance, and the drive motor is started and transfers a torsional force in advance, but the teeth of upper end portion 11 and the teeth of the lower end portion 12 of the brake assembly 1 are not disengaged from each other. Apparently, it is to be noted that, the preset time may be preferably 200 to 400 milliseconds. Specific limitation and repetition are not made here.

In addition, it is worth mentioning that, the drive assembly in the present disclosure may further include the speed reducer 27 that has the output shaft and is connected to the coupling 9 of the rotating shaft assembly, the drive motor, and the electromagnetic brake 30 with one end connected to the input shaft of the speed reducer 27 and the other end connected to the drive motor, so that the rotating shaft assembly is driven to rotate when the drive assembly is arranged along a vertical direction, that is, a vertical side-hung door device is formed. Specific limitation and repetition are not made here.

Further, as a preference, the drive assembly further includes: a multi-turn encoder arranged on the drive shaft of the drive motor, configured to detect magnitude of an external force acting on the door leaf, determine whether there is an abnormal signal and generate a corresponding feedback signal, for example, the resistance signal. In detail, when the side-hung door device in the present disclosure is in normal operation and the door leaf is in a closing movement process, if the door leaf is subjected to resistance greater than 67.5 N or 82.5 N, or resistance corresponding to a resistance value between 67.5 N and 82.5 N, this resistance is transferred to the speed reducer 27 through a brake shaft 182 of the steering speed reducer, and then is transferred to the drive motor, that is, the input shaft of the servo motor 31. The servo controller will receive a feedback signal that is detected by the multi-turn encoder and corresponds to the resistance applied to the servo motor 31, so that the servo controller controls the servo motor to stop rotating according to the received feedback signal. Meanwhile, the servo controller transmits a power-on signal to the electromagnetic brake 30 and the brake assembly 1 to power on the electromagnetic brake 30 and the brake assembly 1. Thus, the door leaf immediately stops moving. Since the door leaf rapidly stops moving, a pedestrian passing through the turnstile is prevented from being caught by the door leaf, and a function of preventing the pedestrian from being caught by the door leaf is realized. After the resistance disappears, the servo controller controls the electromagnetic brake 30 and the brake assembly 1 to lose power according to the received feedback signal detected by the multi-turn encoder, and the servo motor 31 is restarted, so that a side-hung door module mechanism device restores closing operation of the door leaf.

Further, as a preference, the side-hung door device further includes: an automatic reset mechanism connected to the drive assembly, and configured to reset the door leaf to an initial open position when the turnstile is powered off.

Figure 12:
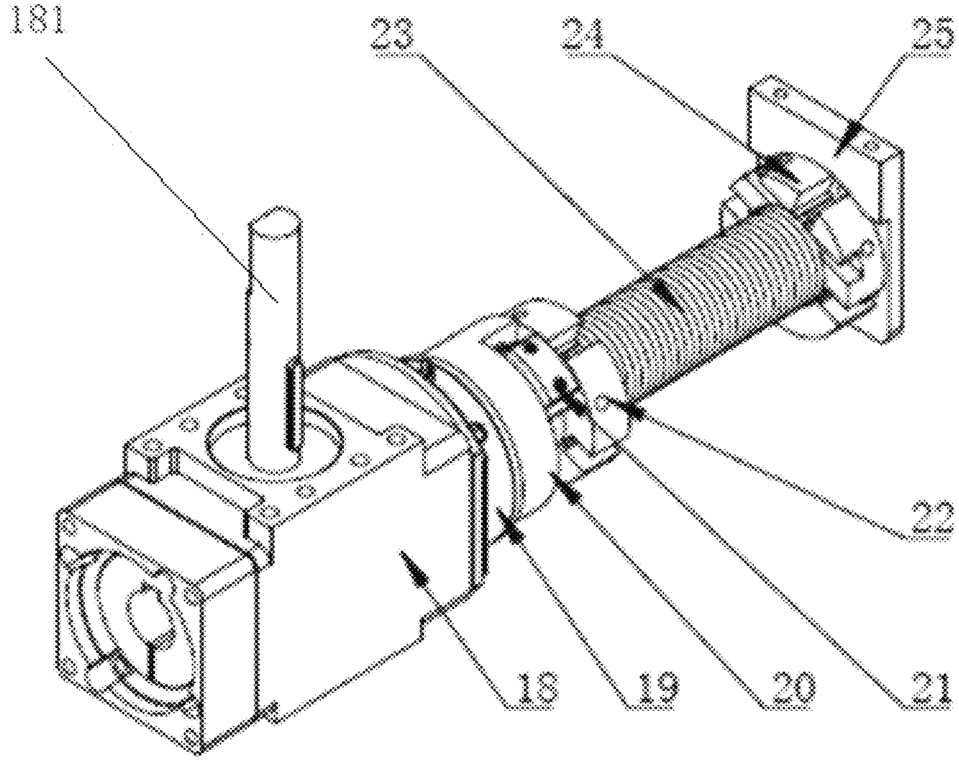
FIG. 12 is a schematic structural diagram of an automatic reset mechanism in the first embodiment of the present disclosure.
Figure 13:
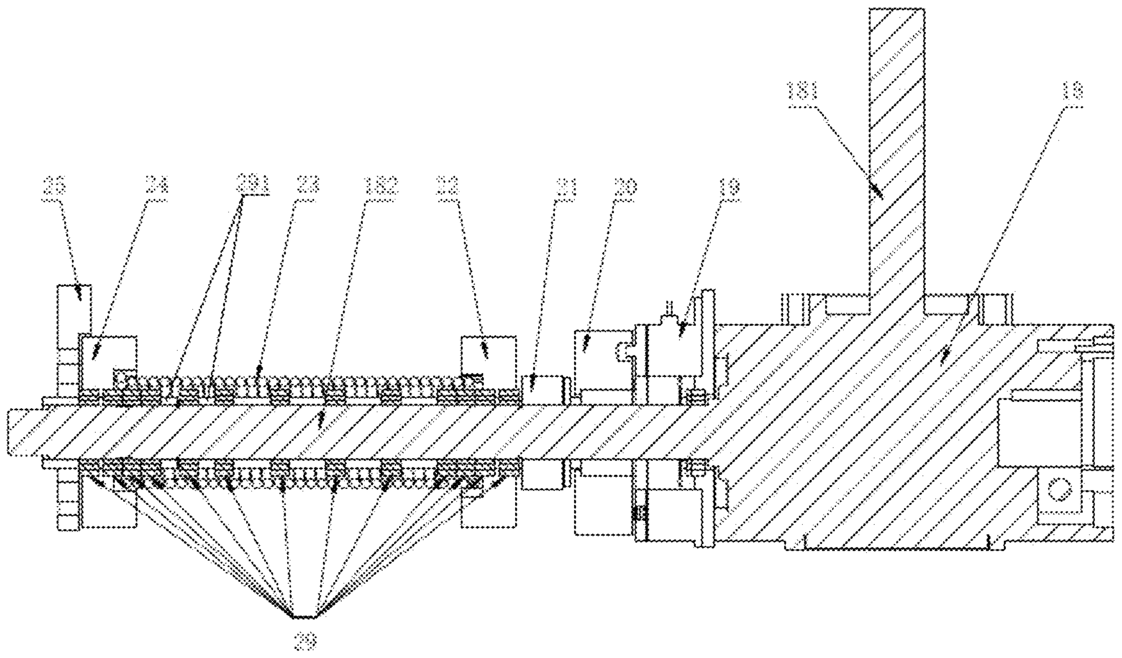
FIG. 13 is a schematic structural diagram of a transverse section of the automatic reset mechanism in the first embodiment of the present disclosure.

Further, as a preference, as shown in FIG. 12 and FIG. 13, the automatic reset mechanism at least includes: a reset electromagnetic brake 19, a torsion spring locking passive member 20, a torsion spring locking active member 21, a first reset torsion spring fixing block 22, a self-resetting torsion spring 23, a second reset torsion spring fixing block 24 that are connected to the steering speed reducer 18 and are sequentially sleeved over the brake shaft of the steering speed reducer 18, a torsion spring locking fixing member 25 configured to fix the second reset torsion spring fixing block 24, and the like.

When the turnstile loses power, a dynamic brake pad in the reset electromagnetic brake 19 is disengaged from a static brake pad, so that the torsion spring locking passive member 20 is unconstrained and follows the torsion spring locking active member 21 to rotate under a resetting action of the self-resetting torsion spring 23. Therefore, the door leaf is reset to the initial open position, the turnstile can be rapidly open, and personnel can pass safely and smoothly.

Moreover, the torsion spring locking fixing member 25 may be preferably a fixing plate connected to the brake shaft 182.

In detail, during normal operation of the side-hung door module device, when there is no pedestrian passes through the turnstile, the door leaf is in a closed position to block the passage of the turnstile channel. The automatic reset mechanism of the door leaf is shown in FIG. 5*a*. During powering on for the first time, the self-resetting torsion spring 23 is tightened to a limiting position for closing the door leaf 5 under the driving of the brake shaft 182 of the steering speed reducer 18 formed by a rectangular axis speed reducer. The reset electromagnetic brake 19 is powered on, the static brake pad is engaged, and the self-resetting torsion spring 23 on the dynamic brake pad is locked by a mechanism. At this moment, the torque of the self-resetting torsion spring 23 is enough to push the door leaf to move. Thus, the self-resetting torsion spring 23 does not participate in movement when the side-hung door device is in normal door opening and closing movement. In an emergency situation that the turnstile or the side-hung door device loses power, the servo motor 31 that drives the door leaf loses power, and the reset electromagnetic brake 19 loses power, so that the dynamic brake pad is disengaged from the static brake pad. The dynamic brake pad of the unconstrained reset electromagnetic brake 19 rotates under an action of the torsional force of the self-resetting torsion spring 23. Torque generated by this automatic reset mechanism, as shown in FIG. 12, is transferred to the rotating shaft assembly and the door leaf 5 through the steering speed reducer 18, so that the turnstile channel is rapidly open, and personnel can pass can pass safely and smoothly.

Further, as a preference, the automatic reset mechanism at least includes: multiple bearing components 29 arranged inside the self-resetting torsion spring 23, sleeved over the brake shaft 182, and coaxially arranged. Through cooperation of the multiple bearing components 29, the self-resetting torsion spring 23 counteracts a frictional force during rotating to ensure smooth rotation of the torsion spring, reduce abnormal sound, or eliminate the abnormal sound. In addition, it is to be noted that, various bearing components 29 in the present disclosure may be closely arranged, cover the brake shaft 182 between the first reset torsion spring fixing block 22 and the second reset torsion spring fixing block 24, or may be arranged on the brake shaft 182 at intervals. Moreover, the bearing component 29 located at a head end is pressed against the first reset torsion spring fixing block 22, and the bearing component 29 located at a tail end is pressed against the second reset torsion spring fixing block 24, so as to ensure that two adjacent bearing components 29 can be adjacent to each other without affecting rotation of the brake shaft 182 during twisting and resetting of the self-resetting torsion spring 23 under a force, thereby avoiding shaking caused by disengagement, reducing wear, and further improving silence performance.

Further, as a preference, a bearing bush 291 that is sleeved over the brake shaft 182 is spaced between at least part two adjacent bearing components 29. The bearing components 29 may be spaced through the bearing bush 291, the number of the bearing components 29 is reduced while ensuring the silence performance, so as to reduce cost, reduce overall weight, and avoid deformation caused by a heavy load subjected to the brake shaft, abnormal sound caused by non-coaxial arrangement of the brake shaft 182 and relevant parts, and influence on service life of the brake shaft.

Further, as a preference, a distance between two adjacent bearing components 29 is gradually reduced from a central area of the self-resetting torsion spring 23 toward two opposite ends of the self-resetting torsion spring until the two adjacent bearing components press against each other; and/or, the bearing component 29 located at the head end is pressed against the first reset torsion spring fixing block 22, and the bearing component 29 located at the tail end is pressed against the second reset torsion spring fixing block 24.

Further, as a preference, a distance between two adjacent bearing components 29 is gradually reduced from a central area of the self-resetting torsion spring 23 toward two opposite ends of the self-resetting torsion spring until the two adjacent bearing components press against each other. Since opposite to ends of the reset torsion spring are first subjected to a force and easy to deform, the opposite two ends of the self-resetting torsion spring 23 can be prevented from misalignment due to excessive and rapid deformation through this structure, so as to avoid noise caused by excessive deformation of the self-resetting torsion spring 23, thereby reducing the probability of failure.

Further, as a preference, various bearing components 29 in the central area of the self-resetting torsion spring 23 are arranged at equal intervals, so as to facilitate selection and arrangement of the bearing bush 291.

In conclusion, the side-hung door device provided in the present disclosure has a function of preventing a pedestrian from getting caught during passing, a function of controlling a forcible opening force of the pedestrian, a function of automatically resetting after the turnstile loses power, and the like in addition to a normal function of opening and closing a turnstile channel.

In addition, the device has adjustable door leaf opening/closing speed, and adjustable torsion force. Moreover, the side-hung door device has a simple and novel structure, complete functions, convenience in control, and more accuracy, and a transmission mechanism of the side-hung door device has the advantages of smooth operation, maintenance free, low noise, low energy consumption, adjustable torsion force, powerful thrust, and the like.

In addition, it is worth mentioning that, the door leaf in the present disclosure may be made of diversified materials such as a Polycarbonate (PC) material or a Polyurethane foam material, so as to further prevent a passenger from being injured by collision. In addition, since the PC material has good transparency, light strips may be bonded to an inner side of the rotating shaft of the door leaf, so that the door leaf emits light in different colors. The rotating shaft of the door leaf is linked to a door plate of the door leaf, the coupling 9, a transmission part, and the like.

Figure 17:
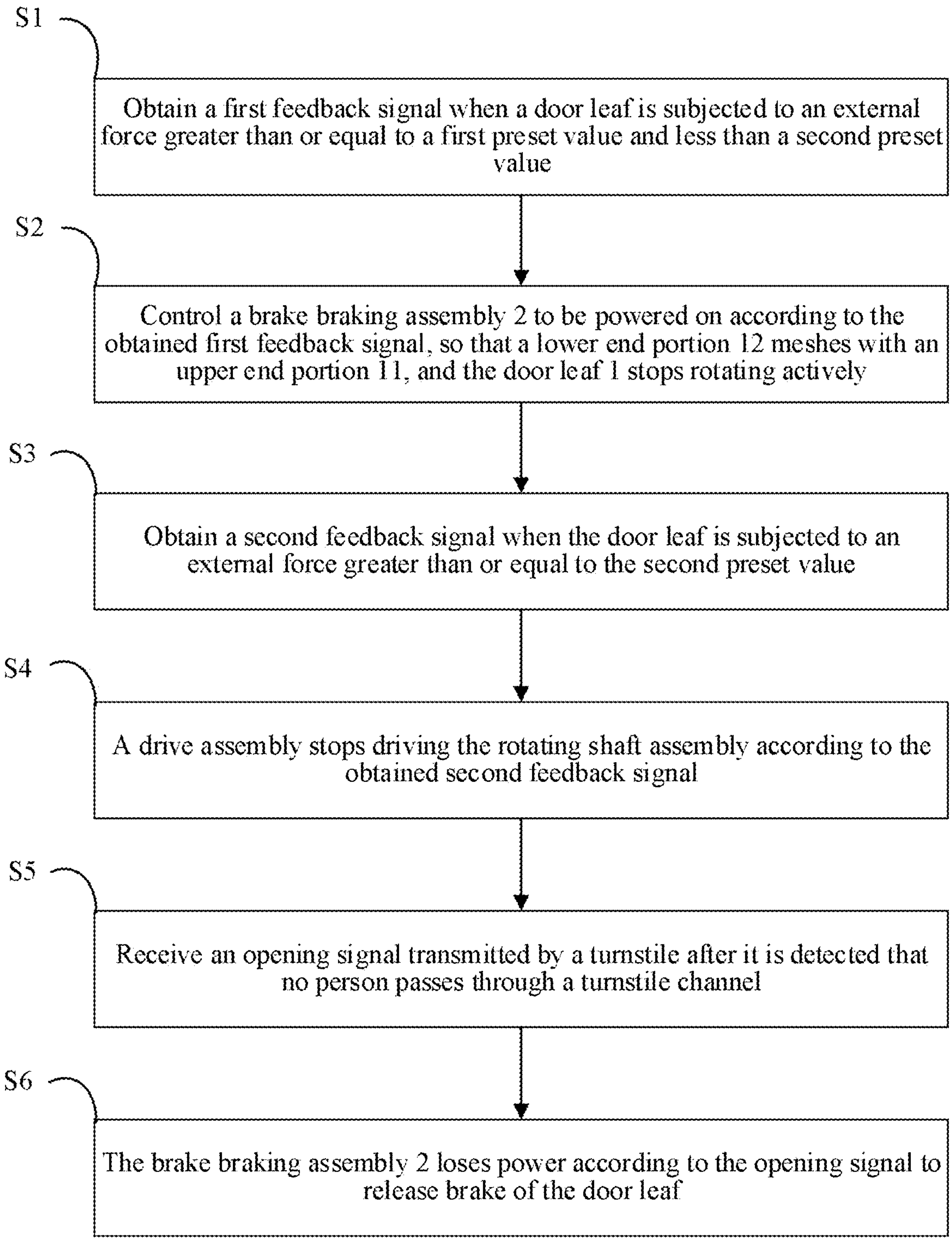
FIG. 17 is a specific flowchart of a control method for the side-hung door device in the first embodiment of the present disclosure.

Specifically, as shown in FIG. 17, the servo controller in the drive assembly is configured to perform the following steps in the control method. The control method includes the following steps.

In step S1: A first feedback signal is obtained when a door leaf is subjected to an external force greater than or equal to a first preset value and less than a second preset value. The present disclosure is described by only taking the first preset value of 67.5 N and the second preset value of 700 N as an example. The first feedback signal is obtained in real time by a multi-turn encoder arranged on a drive shaft of a drive motor.

In step S2: A brake assembly 1 is controlled to be powered on according to the obtained first feedback signal, so that a lower end portion 12 meshes with an upper end portion 11, and the door leaf 5 stops rotating actively.

In step S3: A second feedback signal is obtained when the door leaf is subjected to an external force greater than or equal to the second preset value. The second preset value is greater than the first preset value. The second feedback signal is obtained in real time by the multi-turn encoder arranged on the drive shaft of the drive motor.

In step S4: A drive assembly stops driving the rotating shaft assembly according to the obtained second feedback signal.

In step S5: An opening signal transmitted by a turnstile is received after it is detected that no person passes through a turnstile channel.

In step S6: The brake assembly 1 loses power according to the opening signal to release brake of the door leaf. After the brake of the door leaf is released, the door leaf rotates to a closed position under the driving of the drive assembly to ensure normal operation.

From above steps, it can be learned that: the side-hung door device provided in the present disclosure uses the brake assembly 1 consisting of the upper end portion 11 and the lower end portion 12 that mesh with each other when powered on, so that the drive assembly stops actively driving the rotating shaft assembly to rotate in a case that a pedestrian breaks in, that is, the door leaf is pushed by an external force, for example, greater than or equal to a corresponding preset value, for example, a corresponding preset value within a range of 75+/−10% N in a process that the door leaf rotates from the open position to the closed position, and the brake assembly 1 is powered on, so that the upper end portion 11 and the lower end portion 12 mesh with each other to brake the rotating shaft assembly to achieve emergency brake of the door leaf 5, thereby preventing a human body from breaking in successfully in some situations. Meanwhile, to prevent the human body from being injured when breaking in, when a subjected thrust is greater than a preset value, for example, 700 N, the upper end portion 11 is disengaged from the lower end portion 12, so that the door leaf generates displacement by forcibly pushing, and maximum resistance set for preventing the human body from breaking in is improved in a meshing braking manner of the brake assembly 1. When the thrust forcibly pushing the door leaf disappears, the door leaf of the side-hung door device will be restored to a closed state, so as to close the turnstile channel to ensure normal operation of the turnstile.

When a sensor on the turnstile detects that there is no person in the turnstile, or the thrust forcibly pushing the door leaf disappears, a corresponding command is transmitted to the drive assembly to enable the brake assembly 1 to lose power to release brake, and then the door leaf rotate to a closed state to close the turnstile channel under the driving of the drive assembly, so as to ensure normal operation of the turnstile.

Figure 18:
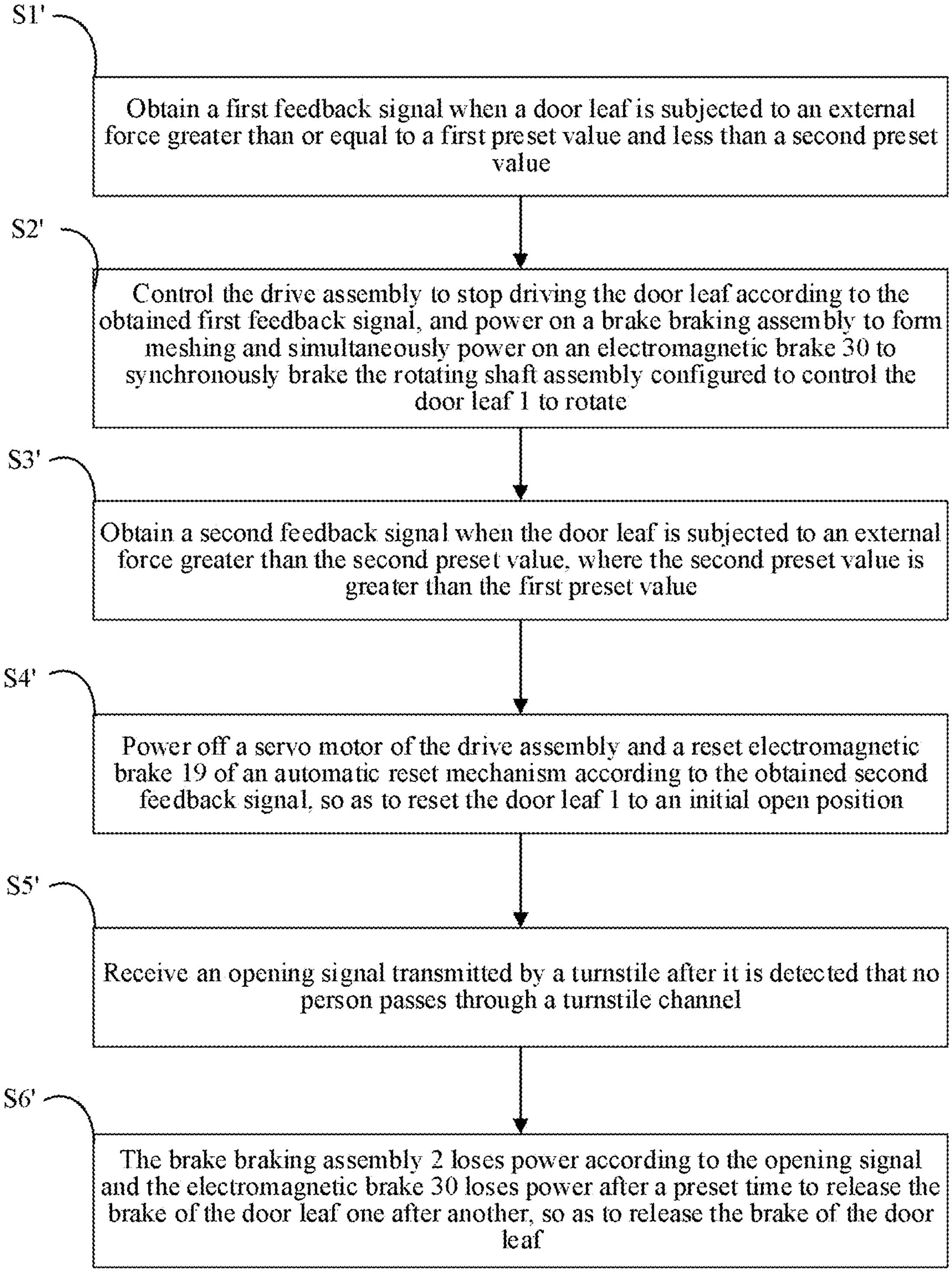
FIG. 18 is a specific flowchart of a control method for a side-hung door device in another embodiment of the present disclosure.

As shown FIG. 18, as another preference, the control method may further specifically include the following steps.

In step S1': A first feedback signal is obtained when a door leaf is subjected to an external force greater than or equal to a first preset value and less than a second preset value. The present disclosure is described by only taking the first preset value of 67.5 N and the second preset value of 700 N as an example. The first feedback signal is obtained in real time by a multi-turn encoder arranged on a drive shaft of a drive motor.

In steps S2': A drive assembly is controlled to stop driving the door leaf according to the obtained first feedback signal, and a brake assembly 1 is powered on to form meshing and simultaneously an electromagnetic brake 30 is powered on to synchronously brake the rotating shaft assembly configured to control the door leaf 5 to rotate.

In step S3': A second feedback signal is obtained when the door leaf is subjected to an external force greater than or equal to the second preset value. The second preset value is greater than the first preset value.

In step S4': The drive assembly stops driving the rotating shaft assembly according to the obtained second feedback signal.

In step S5': An opening signal transmitted by a turnstile is received after it is detected that no person passes through a turnstile channel.

In step S6': The brake assembly 1 loses power according to the opening signal and the electromagnetic brake 30 loses power after a preset time to release the brake of the door leaf one after another. After the brake of the door leaf is released, the door leaf rotates to a closed position under the driving of the drive assembly to ensure normal operation.

From above steps, it can be learned that: the side-hung door device provided in the present disclosure uses the brake assembly 1 consisting of the upper end portion 11 and the lower end portion 12 that mesh with each other when powered on, so that the drive assembly stops actively driving the rotating shaft assembly to rotate in a case that a pedestrian breaks in, that is, the door leaf is pushed by an external force, for example, greater than or equal to a corresponding preset value, for example, 75+/−10% N in a process that the door leaf rotates from the open position to the closed position, and the brake assembly 1 and the electromagnetic brake 30 are simultaneously powered on, so that the upper end portion 11 and the lower end portion 12 mesh with each other to brake the rotating shaft assembly to achieve emergency brake of the door leaf 5, thereby preventing a human body from breaking in successfully in some situations. Meanwhile, to prevent the human body from being injured when breaking in, when a subjected thrust is greater than a preset value, for example, 700 N, the upper end portion 11 is disengaged from the lower end portion 12, so that the door leaf generates displacement by forcibly pushing.

When a sensor on the turnstile detects that there is no person in the turnstile, or the thrust forcibly pushing the door leaf disappears, a corresponding command is transmitted to the drive assembly to enable the brake assembly 1 and the electromagnetic brake 30 to lose power to release brake one after another, and then the door leaf rotate to a closed state to close the turnstile channel under the driving of the drive assembly, so as to ensure normal operation of the turnstile.

In addition, it is worth mentioning that, the steps involved in the control method may alternatively be performed by a processor of a main control device electrically connected to the drive assembly, the brake assembly 1, and the electromagnetic brake 30, for example, a single chip computer. Specific limitation and repetition are not made here.

The above embodiments are only used for describing rather than limiting technical solutions of the present disclosure, and the present disclosure is described in detail only with reference to preferred embodiments. Those of ordinary skill in the art are to be understood that modifications or equivalent replacements may be made to the technical solutions of the present disclosure without departing from the spirit and scope of the technical solutions of the present disclosure, and all fall within the scope of the claims of the present disclosure.

What is claimed is:

1. A side-hung door device, comprising:
- a door leaf;
- a rotating shaft assembly connected to the door leaf;
- a brake assembly connected to the rotating shaft assembly; and
- a drive assembly arranged on a turnstile, connected to the brake assembly, and configured to drive the door leaf to rotate,
- wherein the brake assembly comprises: an upper end portion and a lower end portion, wherein the lower end portion is connected to the drive assembly and the rotating shaft assembly;
- wherein in a process that the door leaf rotates from an open position toward a closed position and after the door leaf is subjected to an external force greater than or equal to a first preset value, the drive assembly stops driving the rotating shaft assembly, while simultaneously, the brake assembly is powered on, and the lower end portion meshes with the upper end portion to brake the rotating shaft assembly; or
- after the door leaf is subjected to an external force greater than a second preset value, the lower end portion and the upper end portion are disengaged to enable the door leaf to displace, wherein the second preset value is greater than the first preset value;
- wherein the side-hung door device further comprises a supporting frame configured to fix the upper end portion, wherein the supporting frame comprises a cover plate component connected to the upper end portion and provided with a through hole, and a plurality of supporting components respectively connected to the cover plate component and the rotating shaft assembly with two opposite ends and forming a placement space for placing the brake assembly, wherein the through hole is configured for an output shaft of the drive assembly to penetrate to connect the output shaft to the rotating shaft assembly;
- the through hole is configured for a protrusion component that is formed by a top of the upper end portion protruding upward to fit and insert to fix and constrain the upper end portion;
- a shape of the through hole is a rectangle or a polygon; and/or
- the first preset value is 75+/−7.5 N, and the second preset value is 700 N.

2. The side-hung door device according to claim 1, further comprising:
- a rotation angle limiting assembly configured to limit a rotation angle of the lower end portion, wherein the rotation angle limiting assembly comprises a rotation angle limiting base, a rotation limiting block connected to the lower end portion and capable of generating axial sliding, and a limiting block arranged on the rotation angle limiting base and configured to limit a rotation angle of the rotation limiting block.

3. A side-hung door device, comprising:
- a door leaf;
- a rotating shaft assembly connected to the door leaf;
- a brake assembly connected to the rotating shaft assembly; and
- a drive assembly arranged on a turnstile, connected to the brake assembly, and configured to drive the door leaf to rotate, wherein the brake assembly comprises: an upper end portion and a lower end portion, wherein the lower end portion is connected to the drive assembly and the rotating shaft assembly;

wherein in a process that the door leaf rotates from an open position toward a closed position and after the door leaf is subjected to an external force greater than or equal to a first preset value, the drive assembly stops driving the rotating shaft assembly, while simultaneously, the brake assembly is powered on, and the lower end portion meshes with the upper end portion to brake the rotating shaft assembly; or after the door leaf is subjected to an external force greater than a second preset value, the lower end portion and the upper end portion are disengaged to enable the door leaf to displace, wherein the second preset value is greater than the first preset value;

wherein the side-hung door device further comprises:

a rotation angle limiting assembly configured to limit a rotation angle of the lower end portion, wherein the rotation angle limiting assembly comprises a rotation angle limiting base, a rotation limiting block connected to the lower end portion and capable of generating axial sliding, and a limiting block arranged on the rotation angle limiting base and configured to limit a rotation angle of the rotation limiting block;

wherein the rotation limiting block comprises a rotating body and a protrusion portion connected to the rotating body, wherein a groove configured to limit the protrusion portion is provided on the limiting block.

4. The side-hung door device according to claim 3, wherein a plurality of bosses are formed along a circumferential direction of the rotating body; a limiting groove body configured for the bosses to insert therein is provided on the lower end portion; and/or the limiting block at least comprises a first limiting block and a second limiting block symmetrically arranged.

5. A side-hung door device, comprising:

a door leaf;

a rotating shaft assembly connected to the door leaf;

a brake assembly connected to the rotating shaft assembly; and a drive assembly arranged on a turnstile, connected to the brake assembly, and configured to drive the door leaf to rotate, wherein the brake assembly comprises: an upper end portion and a lower end portion, wherein the lower end portion is connected to the drive assembly and the rotating shaft assembly;

wherein in a process that the door leaf rotates from an open position toward a closed position and after the door leaf is subjected to an external force greater than or equal to a first preset value, the drive assembly stops driving the rotating shaft assembly, while simultaneously, the brake assembly is powered on, and the lower end portion meshes with the upper end portion to brake the rotating shaft assembly; or after the door leaf is subjected to an external force greater than a second preset value, the lower end portion and the upper end portion are disengaged to enable the door leaf to displace, wherein the second preset value is greater than the first preset value;

wherein the brake assembly is a jaw brake;

both the upper end portion and the lower end portion are disc components provided with meshing teeth in end portions, and the meshing teeth are distributed along circumferential directions of the disc components;

an arrangement direction of the drive assembly is perpendicular to an arrangement direction of the rotating shaft assembly, and the drive assembly is connected to the rotating shaft assembly through a rotating shaft; and/or at least one of the upper end portion and the lower end portion is provided with an electromagnet that is electrically connected to a servo controller and enables the upper end portion and the lower end portion to adsorb and engage with each other when powered on.

6. The side-hung door device according to claim 2, wherein the lower end portion comprises a first body provided with meshing teeth at a top end, and a rotating disc slidably connected to the first body and capable of sliding along an axial direction of the first body, wherein a limiting groove body is formed in the rotating disc to generate axial movement with a rotating body; and the first body moves upward when the brake assembly is powered on, and is adsorbed and meshed by the upper end portion to enable the rotating shaft assembly to be braked following the lower end portion.

7. The side-hung door device according to claim 1, wherein the rotating shaft assembly comprises a rotating shaft connected to the door leaf, a bearing connected to the rotating shaft, and a coupling with one end connected to the bearing and another end configured to connect the output shaft, wherein the coupling is connected to the upper end portion.

8. The side-hung door device according to claim 1, wherein the drive assembly comprises a speed reducer connected to the rotating shaft assembly, a drive motor, and an electromagnetic brake that has one end connected to an input shaft of the speed reducer and another end connected to the drive motor and that is configured to brake the rotating shaft assembly.

9. The side-hung door device according to claim 8, wherein the drive assembly further comprises a steering speed reducer with one end connected to the rotating shaft assembly and another end connected to the speed reducer;

the drive motor comprises: a servo motor configured to drive a drive shaft to rotate, and a servo controller electrically connected to the servo motor, wherein an axial direction of the drive shaft is perpendicular to a direction of the rotating shaft of the door leaf; and/or the electromagnetic brake and the brake assembly are powered on synchronously to brake the door leaf; and after 200 to 400 milliseconds after the brake assembly loses power, the electromagnetic brake loses power to release brake of the door leaf.

10. The side-hung door device according to claim 8, further comprising:

a multi-turn encoder arranged on a drive shaft of the drive motor.

11. The side-hung door device according to claim 1, further comprising:

an automatic reset mechanism connected to the drive assembly, the automatic reset mechanism is configured to reset the door leaf to an initial open position when the turnstile is powered off.

12. The side-hung door device according to claim 11, wherein the automatic reset mechanism at least comprises a reset electromagnetic brake, a torsion spring locking passive member, a torsion spring locking active member, a first reset torsion spring fixing block, a self-resetting torsion spring, a second reset torsion spring fixing block sequentially sleeved over a brake shaft of the drive assembly, and a torsion spring locking fixing member configured to fix the second reset torsion spring fixing block, wherein one end of the reset electromagnetic brake is fixedly connected to the drive assembly, and another end is connected to the torsion spring locking passive member; when the brake assembly and an electromagnetic brake of the drive assembly lose power, a dynamic brake pad in the reset electromagnetic brake is disengaged from a static brake pad, so that the torsion spring locking passive member is unconstrained and follows the torsion spring locking active member to rotate under a resetting action of the self-resetting torsion spring, and the door leaf is reset to an initial open position.

13. The side-hung door device according to claim 12, wherein the automatic reset mechanism at least comprises a plurality of bearing components arranged inside the self-resetting torsion spring, sleeved over the brake shaft, and coaxially arranged.

14. The side-hung door device according to claim 13, wherein at least two adjacent bearing components press against each other;

a bearing component of the at least two adjacent bearing components located at an end of the brake shaft adjacent to the first reset torsion spring fixing block is pressed against the first reset torsion spring fixing block, and a bearing component of the at least two adjacent bearing components located at an end of the brake shaft adjacent to the second reset torsion spring fixing block is pressed against the second reset torsion spring fixing block;

a bearing bush that is sleeved over the brake shaft is spaced between the at least two adjacent bearing components; and/or a distance between the two adjacent bearing components is gradually reduced from a central area of the self-resetting torsion spring toward two opposite ends of the self-resetting torsion spring until the two adjacent bearing components press against each other.

15. A turnstile, comprising the side-hung door device according to claim 1.

16. A control method for the side-hung door device according to claim 1, comprising:

obtaining a first feedback signal when the door leaf is subjected to the external force greater than or equal to the first preset value and less than the second preset value; and controlling the drive assembly to stop driving the door leaf according to the obtained first feedback signal, and powering on the brake assembly to enable the lower end portion of the brake assembly to move upward and mesh with the upper end portion to brake the rotating shaft assembly configured to control the door leaf to rotate.

17. The control method for the side-hung door device according to claim 16, before or after a step of obtaining the first feedback signal after the door leaf is subjected to the external force greater than or equal to the first preset value and less than the second preset value, further comprising:

controlling the drive assembly to stop driving the door leaf according to the obtained first feedback signal, and powering on the brake assembly to form the meshing and simultaneously powering on an electromagnetic brake to synchronously brake the rotating shaft assembly configured to control the door leaf to rotate;

receiving an opening signal transmitted by the turnstile after it is detected that no person passes through a turnstile channel; and enabling the brake assembly to lose power according to the opening signal and enabling the electromagnetic brake to lose power after a preset time to release brake of the door leaf one after another.

18. The control method for the side-hung door device according to claim 16, before or after a step of controlling the drive assembly to stop driving the door leaf according to the obtained first feedback signal, and powering on the brake assembly to enable the lower end portion of the brake assembly to move upward and mesh with the upper end portion to brake the rotating shaft assembly configured to control the door leaf to rotate, further comprising:

obtaining a second feedback signal when the door leaf is subjected to the external force greater than or equal to the second preset value, wherein the second preset value is greater than the first preset value; and stopping driving the rotating shaft assembly by the drive assembly according to the obtained second feedback signal.

19. The control method for the side-hung door device according to claim 17, wherein the preset time is 200 to 400 milliseconds.

* * * * *